`United States Patent Office`

3,346,531
Patented Oct. 10, 1967

3,346,531
INTERPOLYMERS OF A MONOVINYL AROMATIC MONOMER, ALPHA METHYL STYRENE, A MONO-BASIC ACIDIC MONOMER AND AN ACRYLONITRILE
John F. Rooney and Edward W. Boulger, Kankakee, Ill., assignors, by mesne assignments, to Mobil Oil Corporation, a corporation of New York
No Drawing. Filed Jan. 6, 1965, Ser. No. 423,867
10 Claims. (Cl. 260—33.4)

ABSTRACT OF THE DISCLOSURE

A carboxyl functional interpolymer containing the moieties of four monomeric components, namely (1) acrylonitrile or methacrylonitrile in proportions between 2 and 8 weight percent, (2) acrylic acid, methacrylic acid or crotonic acid in proportions between 4 and 12 weight percent, (3) alpha methyl styrene in proportions between 10 and 25 weight percent, and (4) styrene or vinyl toluene in proportions between 55 and 84 weight percent. The interpolymer may be used in coating compositions, primarily as a blending resin to impart soap, stain, and steam resistance to other thermosetting resinous materials.

This invention relates to interpolymers and more particularly to carboxyl functional interpolymers which are useful in coating compositions having improved properties. The interpolymers of the present invention may be used in coating compositions as the sole resinous component thereof, but more commonly they are used in combination with other resinous components, as will be described in more detail hereinafter.

In accordance with the present invention, a carboxyl functional interpolymer is provided which contains the moieties of four monomeric components. The four components are:

(1) A nitrile monomer of the group consisting of acrylonitrile and methacrylonitrile;
(2) An acidic monomer of the group consisting of acrylic acid, methacrylic acid and crotonic acid;
(3) Alpha methyl styrene; and
(4) A vinyl aromatic compound of the group consisting of styrene and vinyl toluene.

The combination of the above monomeric constituents in the proportions specified below produces a resinous material whose principal utility is as a blending resin that provides soap, stain and steam resistance to other thermosetting resinous materials in a coating composition.

The nitrile monomer, which is preferably acrylonitrile, as used in the interpolymer of this invention, is in proportions between about 2 and about 8 wt. percent based upon the total interpolymer weight. The acrylonitrile is included in the interpolymer to provide physical toughness, chemical resistance, steam resistance and hardness.

An acrylonitrile (or methacrylonitrile) content in the interpolymer in excess of about 4 wt. percent tends to produce discoloration. For this reason, it is preferred to limit the acrylonitrile content of the interpolymer to the range between about 2 and about 4 wt. percent of the interpolymer in applications where discoloration is a problem. Thus, when the coating composition is to be used as a clear composition, or when it is to be used as a pigmented composition with white or pastel pigments, it is preferred to utilize no more than about 4 wt. percent of acrylonitrile in the interpolymer. It is surprising that as little as 2–4 wt. percent of acrylonitrile in the polymer can enhance the properties noted above.

Even in those instances where discoloration may not constitute a major problem, it is preferred to utilize concentrations of acrylonitrile in the interpolymer which are not greater than about 4 wt. percent since higher concentrations tend to increase viscosity to an unacceptable level for preparing thin coating films.

The acidic monomer is preferably acrylic acid and is used in the interpolymer in proportions from about 4 to about 12 wt. percent based on the total weight of the interpolymer. The acrylic acid provides carboxyl functionality to the interpolymer to improve adhesion and to improve curing characteristics. The preferred proportion of acidic monomer for optimum water and steam resistance is from about 6 to about 10 wt. percent based on the weight of the interpolymer.

The vinyl aromatic monomer is preferably styrene and is used in proportions from about 55 to about 84 wt. percent, and more preferably from about 66 to about 77 wt. percent, based on the weight of the interpolymer. The styrene contributes hardness to the interpolymer, as well as better soap resistance. In addition, styrene is a low cost monomer and its use as the major monomeric component contributes to the favorable economy of the interpolymer of this invention.

The alpha methyl styrene is generally used in proportions from about 10 to about 25 wt. percent based on the weight of the interpolymer, and preferably in proportions from about 15 to about 20 wt. percent. The alpha methyl styrene serves to reduce the viscosity of the polymer in solution. In the absence of alpha methyl styrene the interpolymer would have too high a viscosity in the coating compositions for the preparation of thin films.

In addition, the presence of alpha methyl styrene in the interpolymer tends to make it less brittle.

Although the interpolymer of this invention may be used in a coating composition as the sole resinous component thereof, it is preferred to blend the interpolymer with other resins capable of being cured. Since the interpolymer of this invention tends to produce brittle coatings, it is preferred that it be used as the sole resinous constituent of a coating composition only for those applications where flexibility does not constitute a problem, as for example, in the coating of light fixtures, doors, and other articles which are not subjected to bending.

When the interpolymer of this invention is used as a blending resin, it is preferred to blend it with a nitrogen-containing curable resin, such as an acrylamide interpolymer which has been reacted with formaldehyde, or a melamine formaldehyde resin. A particularly useful resin blend in which the interpolymer of this invention may be used is a blend of an aldehyde-modified amide polymer, a polyepoxide, and a polymer having carboxyl functionality.

When the interpolymer of this invention is blended with other resins, it generally constitutes from about 5 to about 80 wt. percent of the resin blend. When the interpolymer of this invention is used in a 3-component resin blend, including both a nitrogen-containing thermosetting resin and another resin, such as a polyepoxide, it is generally used in amounts from about 5 to about 30 wt. percent of the resin blend based upon the total weight of the resinous components.

The interpolymer of this invention is prepared by solution polymerization in a solvent system which is predominantly made up of aromatic hydrocarbons. At least 50 percent by weight of the solvent comprises aromatic hydrocarbons, with the remainder generally comprising an alcohol, such as butanol, propanol or amyl alcohol. Preferably, the solvent comprises from about 50 to 85 wt. percent of aromatic hydrocarbons and from about 15 to about 50 wt. percent of an alcohol. Other organic liquids, such as esters, ketones, and glycol ethers may also be present in the solvent mixture.

Generally, the amount of solvent used is about equal in weight to the amount of polymerizable monomers. A suitable range of solvent proportions is one which provides a suitable range of solids content in the final product, namely from about 40 to about 55 weight percent. It is to be understood, however, that the solids content of the final product may be adjusted upward by evaporation or downward by dilution, as desired.

A catalyst such as ditertiary butyl peroxide is used to assist in the polymerization process. A chain terminator, such as tertiary dodecyl mercaptan is used to control the molecular weight of the interpolymer and thereby control its viscosity in solution.

Generally, a mixture of monomers, peroxide catalyst and mercaptan terminator is added to a heated solvent mixture and the thus obtained mixture is maintained at elevated temperature to complete the polymerization process. It is usually advantageous to add the acidic monomer in several portions at spaced intervals, and it is also usually advantageous to add peroxide catalyst in portions at intervals.

Upon completion of the polymerization reaction, the viscosity of the polymer solution and its solids content may be adjusted downward by dilution with additional solvent, either similar to or different from the solvent used in the polymerization reaction. Viscosity and solids content may be adjusted upwardly if desired by evaporation of a portion of the polymerization solvent. A Gardner-Holdt viscosity range from about T to about Y and a solids content of about 50% is preferred.

Compositions containing the interpolymer of this invention are curable on baking, with optimum temperatures and time being dependent on the nature and proportions of the monomers used in the preparation of the carboxyl functional interpolymer and the nature and proportions of the interpolymers blended therewith. Moderate curing temperatures in the neighborhood of about 300°–350° F. and curing times of about ½ to 1 hour are generally adequate.

The coating compositions in which the carboxyl functional interpolymers of this invention are used may be clear or pigmented as desired, or may contain filters, flow control agents or other additives for their normal purposes.

The invention is illustrated in the examples which follow:

EXAMPLE I

*Production of carboxyl-functional interpolymer—Charge composition*

Parts

Charge #1:
    Commercial mixture of aromatic hydrocarbon
        solvents (boiling range 145–195° C.) ____ 32.44
    n-Butyl alcohol _____ 12.50

Charge #2:
    Styrene _____ 34.84
    a-Methyl styrene _____ 8.01
    Acrylonitrile _____ 1.57
    Glacial acrylic acid _____ 2.74
    t-Dodecyl mercaptan _____ 0.50
    Di-tertiary-butyl peroxide _____ 0.61

Charge #3:
    Glacial acrylic acid _____ 0.35
    Glacial acrylic acid _____ 0.51
    Glacial acrylic acid _____ 0.70

Charge #4:
    Di-tertiary-butyl peroxide _____ 0.06
    Di-tertiary-butyl peroxide _____ 0.06
    Di-tertiary-butyl peroxide _____ 0.06
    Di-tertiary-butyl peroxide _____ 0.06

Charge #5:
    2-ethoxy ethanol acetate _____ 4.99

*Procedure of preparation.*—Charge #1 is heated to 120° C. and Charge #2 is then added to the preheated solvents. After the completion of adding Charge #2, the mixture is maintained at 120° C. for one-half hour. Then add the three portions of Charge #3 to the reaction mixture at one-half hour intervals. After the addition of Charge #3 is completed, hold at 127° C. for 1¾ hours and then add the four portions of Charge #4 to the mixture at one-half hour intervals. After the addition of Charge #4 is completed, hold for a viscosity of X+ (Gardner-Holdt) which is obtained in approximately 2–2½ hours. The mixture so-obtained is water cooled to 90° C. and thinned with Charge #5 to provide a product having the following final characteristics:

Solids, percent _____ 50
Acid value (on non-volatiles) _____ 60–70
Color, Helige _____ 1–2
Viscosity (Gardner-Holdt) _____ U–W

EXAMPLE II

*Production of typical aldehyde-modified amide interpolymer blending resin—Charge composition*

Charge #1:
Parts
    Acrylamide _____ 3.70
    Styrene _____ 22.15
    Isobutyl acrylate _____ 11.08
    Cumene hydroperoxide _____ 0.40
    t-Dodecyl mercaptan _____ 0.39
    Glacial acrylic acid _____ 1.60
    n-Butyl alcohol _____ 22.84

Charge #2:
    Cumene hydroperoxide _____ 0.13

Charge #3:
    Cumene hydroperoxide _____ 0.13

Charge #4:
    40% solution of formaldehyde in isobutanol __ 9.87

Charge #5:
    Maleic anhydride _____ 0.16

Charge #6:
    Commercial mixture of aromatic hydrocarbon
        solvents (boiling range 145–195° C.) ____ 19.29
    Diacetone alcohol _____ 8.26

100.00

*Procedure of preparation.*—Charge #1 is heated to 90° C. in 40 minutes. The temperature is then gradually raised to 104° C. over a period of one and one-half hours and then add Charge #2. After an additional hour has elapsed, Charge #3 is added and the reaction continued for 2½ hours to provide a product which, when cooled to 77° F. has a viscosity of Z6+ (Gardner-Holdt). The reaction mass is then cooled about 4° C. below reflux temperature and Charges #4 and #5 are added over a 10 minute period. The reaction mixture is cooked at a temperature 4° C. below reflux for an additional 1 hour and 50 minutes to provide a viscosity of Y (Gardner-Holdt). A vacuum is then applied to remove about 13.5% of the charge and this serves to remove most of the water and a portion of the solvents to provide a viscous mixture which is then thinned with Charge #6. The final characteristics of the product are:

Solids, percent _____ 50
Acid value (on non-volatiles) _____ 27–32
Color (Helige) _____ 1–2
Viscosity (Gardner-Holdt) _____ W–Y

EXAMPLE III

*Coating composition utilizing the carboxyl functional interpolymer of the invention*

The interpolymers of Examples I and II and a polyepoxide are formulated into a top coat appliance finish as follows.

*Procedure of preparation:*

| | Pounds |
|---|---|
| Titanium dioxide (chloride type) | 303 |
| Finely divided silica | 7 |
| Solution interpolymer of Example I (the 50% solids solution product) | 146 |
| Xylol | 46 |

Grind in a sand mill at 150–160° F. to a 7½ North Standard gauge fineness;

| | Pounds |
|---|---|
| Solution interpolymer of Example I (the 50% solids solution product) | 215 |
| Solution interpolymer of Example II (the 50% solids solution product) | 140 |
| 50% solution of polyepoxide [1] in equal parts of 2-ethoxy ethanol acetate and xylol | 68.4 |

Blend in, one by one;

| | Pounds |
|---|---|
| Xylol | 102.0 |

Thin to desired viscosity (the exact proportion of xylol is adjusted to the viscosity that is desired).

[1] The polyepoxide used is a polyglycidyl ether of bisphenol A having an average molecular weight of 1000, a melting range of 64°–76° C., an epoxy value of 0.20 equivalents per 100 grams and a hydroxyl value of 0.32 equivalent per 100 grams.

The coating solution produced above weighs 10.27 pounds per gallon, has a non-volatile solids content of 57.7% and has a No. 4 Ford Cup viscosity of 65–75 seconds.

When this coating solution is applied to zinc phosphate-treated cold rolled steel and baked for 30 minutes at 325° F. with a sufficient thickness of coating applied to provide a dry film thickness of 1.4 mils, the baked coating has the following characteristics.

| | |
|---|---|
| Pencil hardness | 2H. |
| 60° Gloss reading | 80%. |
| Impact: | |
|     Forward | Pass 28 inch/lbs. |
|     Reverse | Pass 4-6 inch/lbs. |
| Flexibility (Mandrel bend) | Pass ⅜ inch. |
| Stain Resistance: | |
|     Mustard | No staining after 100 hours. |
|     Lipstick | |
| Grease Resistance | No change in pencil hardness after contact for 16 hours at 200° F. |
| Resistance to overbake (16 hours at 300° F.) | Good. |
| Detergent Resistance (Immersed in 1% aqueous solution of "Tide" at 165° F. for 200 hours) | (Few blisters—good detergent resistance). |

Thermal shock—thermal shock is tested by contacting with cold water (40–50° F.) and then with hot water (190° F.) alternating for 1 minute apiece for two days. The coating does not crack after the two day test.

EXAMPLE IV

*Production of typical melamine formaldehyde blending resin*

| Charge composition: | Parts |
|---|---|
| Solution of formaldehyde (40%) in butanol | 375 |
| 10% NaOH solution (to pH 6.8–7.4) | |
| Water | 70 |
| n-Butanol | 241 |
| Melamine | 126 |
| Oxalic acid dissolved in butanol (to pH 5.9–6.1) n-Butanol | 133 |
| Xylol (adjust as needed, depending upon resin yield to give 50% resin solids in 80% Butanol 20% xylol) | 62.7 |

*Procedure of preparation.*—The formaldehyde solution is charged into a suitable reaction chamber equipped with thermometer, stirrer, reflux condenser and a water trap through which the reflux condensate passes on its return to the reaction chamber. This trap serves as a separator to remove the aqueous fraction of the condensate from the non-aqueous fraction.

The pH of the formaldehyde solution is adjusted within the range of 6.8 to 7.4 by addition of small quantities of an aqueous solution containing 10% NaOH.

After the pH adjustment, the water, melamine and first charge of n-butanol are added.

The mass is then heated with agitation to 85° C. in approximately forty-five minutes and held at a temperature range of 85–90° C. until the melamine is completely dissolved. (Approx. one-half hour.)

The mass is then heated to 98° C. at which temperature refluxing occurs and water starts to collect in the trap.

After ¾ of an hour at reflux temperature with constant water separation and collection in progress, addition of a butanol solution of oxalic acid is begun. This addition is done at such a rate as to allow the entire addition to be completed in one hour.

Sufficient acid is used to adjust the pH to a range of 5.9–6.1.

During this time, water is continuously removed by azeotropic distillation from the reaction mixture as refluxing continues.

After approximately 3½ hours at reflux, the temperature will rise to 101° C. At this point, most of the solution water and reaction water has been removed.

The remaining butanol is then added and the distillate (butanol containing some water) is removed under a vacuum of 7 to 15 inches at a temperature which rises from 101 to 106° C. in a three-hour period.

At this time, all but minute traces of water have been removed and the solution has been concentrated to about 58–62% solids.

The resulting resin solution is then diluted to 50% solids by the addition of xylol.

EXAMPLE V

*Alternate coating composition utilizing the carboxyl functional interpolymer of the invention*

Thirty parts by weight of the resin solution of Example IV is blended with seventy parts of the resin solution of Example I and the mixture is diluted with 12½ parts of xylol to produce a solution having a 40% solids content.

The solution is coated onto a panel which is then baked, at about 300° F. for about one-half hour. A clear thermoset coating is formed on the panel which has a hard finish but is somewhat brittle.

Polymer blends containing the interpolymer of this invention are exceptionally resistant to the effects of high temperature steam and are suitable for can coating applications. The steam resistance test is generally carried out on a clear resin coating and consists of subjecting a coated container to steam in a pressure cooker at a temperature of 250° F. for 90 minutes.

In the steam resistant resin blends, there is no loss of gloss on the coating and no blushing or softening.

The invention is defined in the claims which follow.

We claim:

1. A carboxyl functional interpolymer consisting essentially of from about 2 to about 8 weight percent of moieties of at least one nitrile monomer of the group consisting of acrylonitrile and methacrylonitrile, from about 4 to about 12 weight percent of moieties of at least one acidic monomer of the group consisting of acrylic acid, methacrylic acid and crotonic acid, from about 10 to about 25 weight percent of alpha methyl styrene moieties and from about 55 to about 84 weight percent of moieties of at least one vinyl aromatic monomer of the group consisting of styrene and vinyl toluene.

2. A carboxyl functional interpolymer composition comprising from about 35 to about 55 weight percent of an interpolymer and from about 45 to about 65 weight percent of a solvent, said interpolymer consisting essentially of from about 2 to about 8 weight percent of moieties of at least one nitrile monomer of the group consisting of acrylonitrile and methacrylonitrile, from about 4 to about 12 weight percent of moieties of at least one acidic monomer of the group consisting of acrylic acid, methacrylic acid and crotonic acid, from about 10 to about 25 weight percent of alpha methyl styrene moieties and from about 55 to about 84 weight percent of moieties at least one vinyl aromatic monomer of the group consisting of styrene and vinyl toluene, and said solvent comprising at least 50 weight percent of aromatic hydrocarbons.

3. A carboxyl functional interpolymer composition comprising from about 35 to about 55 weight percent of an interpolymer and from about 45 to about 65 weight percent of a solvent, said interpolymer consisting essentially of from about 2 to about 8 weight percent of moieties of at least one nitrile monomer of the group consisting of acrylonitrile and methacrylonitrile, from about 4 to about 12 weight percent of moieties of at least one acidic monomer of the group consisting of acrylic acid, methacrylic acid and crotonic acid, from about 10 to about 25 weight percent of alpha methyl styrene moieties and from about 55 to about 84 weight percent of moieties of at least one vinyl aromatic monomer of the group consisting of styrene and vinyl toluene, and said solvent comprising from about 50 to about 85 parts by weight of aromatic hydrocarbon and from about 15 to about 50 parts by weight of an alcohol.

4. The composition of claim 3 wherein said alcohol is n-butanol.

5. A carboxyl functional interpolymer consisting essentially of from about 2 to about 8 weight percent of acrylonitrile moieties, from about 4 to about 12 weight percent of acrylic acid moieties, from about 10 to about 25 weight percent of alpha methyl styrene moieties and between about 55 and about 84 weight percent of styrene moieties.

6. A carboxyl functional interpolymer composition comprising from about 35 to about 55 weight percent of an interpolymer and from about 45 to about 65 weight percent of a solvent, said interpolymer consisting essentially of from about 2 to about 8 weight percent of acrylonitrile moieties, from about 4 to about 20 weight percent of acrylic acid moieties, from about 10 to about 25 weight percent of alpha methyl styrene moieties and between about 55 and about 84 weight percent of styrene moieties and said solvent comprising at least 50 weight percent of aromatic hydrocarbons.

7. A carboxyl functional interpolymer composition comprising from about 35 to about 55 weight percent of an interpolymer and from about 45 to about 65 weight percent of a solvent, said solvent comprising from about 50 to about 85 parts by weight of aromatic hydrocarbons and from about 15 to about 50 parts by weight of an alcohol and said interpolymer consisting essentially of from about 2 to about 4 weight percent of acrylonitrile, from about 4 to about 12 weight percent of acrylic acid, from about 15 to about 20 weight percent of alpha methyl styrene and from about 66 to about 77 weight percent of styrene.

8. A method of preparing a carboxyl functional interpolymer which comprises copolymerizing from about 2 to about 8 weight percent of a nitrile monomer of the group consisting of acrylonitrile and methacrylonitrile, from about 4 to about 12 weight percent of an acidic monomer of the group consisting of acrylic acid, methacrylic acid and crotonic acid, from about 10 to about 25 weight percent of alpha methyl styrene and from about 55 to about 84 weight percent of a vinyl aromatic monomer of the group consisting of styrene and vinyl toluene, all of the foregoing percentages being based on the total weight of polymerizable monomers in the reaction mixture.

9. A method of preparing a carboxyl functional interpolymer which comprises copolymerizing in solution in a solvent comprising at least 50 weight percent of aromatic hydrocarbons from about 2 to about 8 weight percent of a nitrile monomer of the group consisting of acrylonitrile and methacrylonitrile, from about 4 to about 12 weight percent of an acidic monomer of the group consisting of acrylic acid, methacrylic acid and crotonic acid, from about 10 to about 25 weight percent of alpha methyl styrene and from about 55 to about 84 weight percent of a vinyl aromatic monomer of the group consisting of styrene and vinyl toluene, all of the foregoing monomer percentages being based on the total weight of polymerizable monomers in the reaction mixture.

10. A method of preparing a carboxyl functional interpolymer which comprises copolymerizing from about 2 to about 4 weight percent of acrylonitrile, from about 6 to about 10 weight percent of acrylic acid, from about 15 to about 20 weight percent of alpha methyl styrene and from about 66 to about 77 weight percent of styrene, all of the foregoing percentages being based on the total weight of polymerizable monomers in the reaction mixture, in solution in a solvent comprising from about 50 to about 85 parts by weight of aromatic hydrocarbons and from about 15 to about 50 parts by weight of an alcohol.

References Cited

UNITED STATES PATENTS

| | | |
|---|---|---|
| 2,604,457 | 7/1952 | Segall et al. |
| 2,759,910 | 8/1956 | Milne et al. |
| 2,772,253 | 11/1956 | Chapin. |
| 2,816,827 | 12/1957 | Roth _____ 260—33.4 |
| 2,890,148 | 6/1959 | Dede. |
| 3,068,183 | 12/1962 | Strolle _____ 260—33.4 |

JULIUS FROME, *Primary Examiner.*

L. T. JACOBS, *Assistant Examiner.*